(12) United States Patent
Ohlgren

(10) Patent No.: US 11,647,245 B2
(45) Date of Patent: May 9, 2023

(54) SELECTION OF A WIRELESS DEVICE TO BE REMOTELY CONTROLLED BY A USER INTERFACE DEVICE FOR MEDIA PRESENTATION IN A VEHICLE

(71) Applicant: Spotify AB, Stockholm (SE)

(72) Inventor: Håkan Ohlgren, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/227,095

(22) Filed: Apr. 9, 2021

(65) Prior Publication Data

US 2022/0038764 A1 Feb. 3, 2022

(30) Foreign Application Priority Data

Jul. 30, 2020 (EP) .................................... 20188780

(51) Int. Cl.
*H04W 4/48* (2018.01)
*H04N 21/414* (2011.01)
(Continued)

(52) U.S. Cl.
CPC ..... *H04N 21/41422* (2013.01); *H04L 67/125* (2013.01); *H04N 21/4126* (2013.01); *H04W 4/48* (2018.02); *H04W 4/80* (2018.02)

(58) Field of Classification Search
CPC .... H04W 4/48; H04W 4/80; H04N 21/41422; H04N 21/4126
See application file for complete search history.

(56) References Cited

U.S. PATENT DOCUMENTS 8,626,144 B2 1/2014 Talty et al.
2012/0066419 A1 3/2012 Park et al.
(Continued)

FOREIGN PATENT DOCUMENTS

KR 102026093 B1 9/2019
WO WO2018219784 A1 12/2018

OTHER PUBLICATIONS

Spotify AB, Extended European Search Report, EP20188780.9, dated Dec. 15, 2020, 9 pgs.
(Continued)

*Primary Examiner* — Andrea C Leggett
(74) *Attorney, Agent, or Firm* — Morgan, Lewis & Bockius LLP

(57) ABSTRACT

A method for media presentation in a vehicle includes receiving a Bluetooth Low Energy (BLE) advertising message from a user interface (UI) device. The method includes: waking an application module of the first wireless device; authorizing the UI device to remotely control media presentation as presented by the application module; and determining whether the first wireless device is paired or in a current cabled connection with a vehicle head unit of the vehicle. The method includes, when the first wireless device is paired or in a current cabled connection with the vehicle head unit, selecting the first wireless device for subsequent communication with the UI device to control the media presentation, and when the first wireless device is not paired with the vehicle head unit and not in a current cabled connection with the vehicle head unit, terminating the authorization of the UI device to remotely control media presentation.

19 Claims, 7 Drawing Sheets

(51) Int. Cl.
  *H04W 4/80* (2018.01)
  *H04L 67/125* (2022.01)
  *H04N 21/41* (2011.01)

(56) References Cited

U.S. PATENT DOCUMENTS

| | | |
|---|---|---|
| 2014/0378063 A1 | 12/2014 | Nathwani et al. |
| 2016/0144826 A1 | 5/2016 | Thomas et al. |
| 2016/0150352 A1 | 5/2016 | Saed et al. |
| 2016/0343410 A1* | 11/2016 | Smith .................... G11B 27/28 |
| 2017/0180438 A1* | 6/2017 | Persson ................. G11B 27/10 |
| 2017/0244770 A1* | 8/2017 | Eckerdal ................ H04L 67/42 |
| 2017/0309098 A1 | 10/2017 | Watters et al. |
| 2018/0129745 A1* | 5/2018 | Jehan ...................... G06F 16/41 |
| 2018/0271710 A1* | 9/2018 | Boesen ................ H04R 1/1041 |
| 2018/0288208 A1* | 10/2018 | Lee ........................ G06F 1/1683 |
| 2019/0248331 A1* | 8/2019 | Salah .................... G01S 5/0284 |

OTHER PUBLICATIONS

Spotify AB, Communication Pursuant to Article 94(3), EP20188780.9, dated Apr. 13, 2021, 4 pgs.
Spotify AB, Extended European Search Report, EP22163759.8, dated Apr. 25, 2022, 8 pgs.

* cited by examiner

SELECTION OF A WIRELESS DEVICE TO BE REMOTELY CONTROLLED BY A USER INTERFACE DEVICE FOR MEDIA PRESENTATION IN A VEHICLE

PRIORITY APPLICATIONS

The Application claims priority to European Application No. EP 20188780.9, filed Jul. 30, 2020, which is hereby incorporated by reference in its entirety.

TECHNICAL FIELD

The present disclosure generally relates to methods, systems and related devices (e.g., a User Interface (UI) device, a wireless device) and computer program products and carriers for assisting in selecting a wireless device (among one or several wireless devices) to be controlled by a UI device for presentation or playback of media content in a vehicle, such as a car.

BACKGROUND

Many people enjoy consuming media content while travelling or during other activities. For example, many drivers and passengers listen to audio content, such as songs, albums, podcasts, audiobooks, and other types of audible content, in vehicles. Typical sources of such audio content in vehicles include media playback devices, such as mobile phones or tablets running audio streaming applications, which can offer a personalized and flexible music-consuming experience using large catalogues of media content available from a media content server.

FIG. 1 illustrates an example system 100 for streaming media content for playback that can be used in a vehicle 80, such as a car. The system 100 may include one or more media playback devices 104 configured to present or otherwise playback media content. Examples of the media playback devices 104 may include one or more of a personal media streaming appliance (PMSA) system 110, and a mobile computing device 118 (also interchangeably referred to as a wireless device 118 herein). The system 100 may also include one or more of a media delivery system 112 and a vehicle media playback system 114. Data communication within the system 100 may for example occur using one or more of a data communication network 116 and an in-vehicle wireless data communication network 122. The system 100 may be substantially as described in European patent application publication EP 3 564 794 A1, and details of its structure and function will not be discussed in detail here. In brief, the system 100 is operable to generate a media output 124 to present or otherwise playback media content in the vehicle 80, i.e. typically in the cabin of the vehicle 80. The vehicle 80 may include a dashboard 82 or a vehicle head unit 84. In many cases, and as described in EP 3 564 794 A1, a user U may want to mount a device, for example a UI device 110, within the vehicle 80, for example on the dashboard 82. The UI device 110 may be embodied as a remote control appliance (RCA) or as the PMSA system 110 described in EP 3 564 794 A1. As such, the UI device 110 can be used as a media playback control assembly.

The disclosure of EP 3 564 794 A1 is hereby incorporated by reference in its entirety to give context and background to the various aspects and embodiments that will be disclosed throughout this disclosure.

SUMMARY

It is in view of the above considerations and others that the various embodiments disclosed herein have been made. For example, the present disclosure recognizes the fact that there is a need for improved ways of selecting a wireless device (among one or several wireless devices) to be remotely controlled by a UI device for media presentation in a vehicle. For instance, there exist scenarios where several users and their respective wireless devices (e.g., smartphones) may be present in the cabin of the vehicle or in the vicinity of the vehicle at the same time. In such scenarios, there is a risk that the UI device described in the background section above may connect to an incorrect or un-preferred wireless device if there are multiple users and, thus, multiple wireless devices present in the vehicle at the same time. In such scenarios, there is a risk that the UI device could begin remotely controlling an application module of a wireless device that is actually not paired or not in a cabled connection with the vehicle head unit of the vehicle. This may be annoying to people who want to enjoy consuming media content while travelling in the vehicle.

In view of the above, a general object of the embodiments described herein is to allow for an improved selection of a wireless device (i.e., at least one) to be remotely controlled by a UI device for media presentation in a vehicle. It would be particularly advantageous to address the above-described and related scenarios when multiple users and their respective wireless devices are present in a vehicle such as a car at the same time.

This general object has been addressed by the appended independent claims. Advantageous embodiments are described in the dependent claims.

In a first of its aspects, the present disclosure presents a method for selecting a wireless device to be remotely controlled by a UI device for media presentation in a vehicle. The method comprises: the User Interface (UI) device broadcasting a Bluetooth Low Energy (BLE) advertising message receivable by one or several wireless devices located in vicinity of the UI device; responsive to a receipt of a broadcasted BLE advertising message from the UI device, waking up an application module of each one of the wireless devices located in vicinity of the UI device; and in each one of said wireless devices: the application module authorizing the UI device to remotely control media presentation as presented by the application module; and the application module further initiating a checking operation to determine whether the wireless device is paired (i.e., is in current wireless connection) or is in a current cabled connection with a vehicle head unit (aka infotainment system or vehicle media playback system) of the vehicle; and upon a determination that the wireless device is paired or is in a current cabled (or wired) connection with the vehicle head unit, selecting the wireless device for subsequent communication with the UI device to enable the UI device to continue to remotely control the media presentation as presented by the application module of the wireless device; else upon a determination that the wireless device is not paired with the vehicle head unit and is not in a current cabled connection with the vehicle head unit, terminating the authorization of the UI device to remotely control media presentation as presented by the application module.

Typically, but not necessarily, the UI device is mounted to a structure (e.g. a dashboard) of the vehicle and the UI device is separate and distinct from the vehicle head unit of the vehicle.

In some embodiments, the UI device is a Remote Control Appliance (RCA).

In some embodiments, the UI device is a Personal Media Streaming Appliance (PMSA).

Optionally, broadcasting the BLE advertising message occurs responsive to an occurrence of a vehicle operation. In some embodiments, the occurrence of the vehicle operation includes a vehicle start operation (i.e., activation of the vehicle). For example, the vehicle start operation may be an engine start operation.

As will be appreciated, the broadcasting of the BLE advertising message may thus occur responsive to at least one vehicle operation. As a non-limiting example, the at least one vehicle operation may include one or several of the following: a vehicle start operation (i.e., activation of the vehicle) such as e.g. an engine start operation, a start operation of the air-conditioning (AC) system of the vehicle, a start operation of the head unit 84. Additionally, or alternatively, the broadcasting of the BLE advertising message may occur responsive to at least one of the following: a detected presence of a wireless device 118 in a vicinity of the vehicle 80, a detected presence of user (i.e. a human) in the cabin of the vehicle 80, a voice command from a user U.

In some embodiments, the application module authorizing the UI device to remotely control media presentation as presented by the application module includes:

the application module authorizing the UI device to remotely control media presentation as presented by the application module wirelessly by means of Bluetooth technology.

In some embodiments, the application module further initiating a checking operation to determine whether the wireless device is paired includes a checking operation to determine whether the wireless device is wirelessly paired by means of Bluetooth technology.

In some embodiments, the application module further initiating a checking operation to determine whether the wireless device is in a current cabled connection includes a checking operation to determine whether is in a current cabled (wired) connection with said vehicle head unit of the vehicle via a Universal Serial Bus (USB) connection or an auxiliary (AUX) connection.

In a second of its aspects, the present disclosure presents a method performed by a UI device for assisting in selecting a wireless device to be remotely controlled by a UI device for media presentation in a vehicle, the method comprising: broadcasting a Bluetooth Low Energy (BLE) advertising message receivable by one or several wireless devices located in the vicinity of the UI device.

In some embodiments, the UI device is a Remote Control Appliance (RCA).

In some embodiments, the UI device is a Personal Media Streaming Appliance (PMSA).

Optionally, broadcasting the BLE advertising message occurs responsive to an occurrence of a vehicle operation. In some embodiments, the occurrence of the vehicle operation includes a vehicle start operation (i.e., activation of the vehicle). For example, the vehicle start operation may be an engine start operation. As will be appreciated, the broadcasting of the BLE advertising message may thus occur responsive to at least one vehicle operation. As a non-limiting example, the at least one vehicle operation may include one or several of the following: a vehicle start operation (i.e., activation of the vehicle), a start operation of the air-conditioning (AC) system of the vehicle, a start operation of the head unit 84. Additionally, or alternatively, the broadcasting of the BLE advertising message may occur responsive to at least one of the following: a detected presence of a wireless device 118 in a vicinity of the vehicle 80, a detected presence of user (i.e. a human) in the cabin of the vehicle 80, a voice command from a user U. In a third of its aspects, the present disclosure presents a method performed by a wireless device, the method comprising: responsive to a receipt of a broadcasted Bluetooth Low Energy (BLE) advertising message from a UI device, waking up an application module of the wireless device; authorizing, by the application module, the UI device to remotely control media presentation as presented by the application module; and initiating, by the application module, a checking operation to determine whether the wireless device is paired (i.e., is in current wireless connection) or is in a current cabled (wired) connection with a vehicle head unit of the vehicle; and upon a determination that the wireless device is paired or is in a current cabled connection with the vehicle head unit, selecting the wireless device for subsequent communication with the UI device to enable the UI device to continue to remotely control the media presentation as presented by the application module of the wireless device; else upon a determination that the wireless device is not paired with the vehicle head unit and is not in a current cabled connection with the vehicle head unit terminating the authorization of the UI device to remotely control media presentation as presented by the application module.

In some embodiments, the application module authorizing the UI device to remotely control media presentation as presented by the application module may include: the application module authorizing the UI device to remotely control media presentation as presented by the application module wirelessly by means of Bluetooth technology.

In some embodiments, the application module further initiating a checking operation to determine whether the wireless device is paired includes a checking operation to determine whether the wireless device is wirelessly paired by means of Bluetooth technology.

In some embodiments, the application module further initiating a checking operation to determine whether the wireless device is in a current cabled connection may include a checking operation to determine whether is in a current cabled connection with said vehicle head unit of the vehicle via a Universal Serial Bus (USB) connection.

In a fourth of its aspects, the present disclosure presents a wireless device, comprising: at least one processor; and a memory, said memory comprising instructions executable by said at least one processor whereby the wireless device is operative to perform the method according to the third aspect described above.

In a fifth of its aspects, the present disclosure presents a UI device mountable at a structure of a vehicle for assisting in selecting a wireless device for pairing with a vehicle head unit of the vehicle, the UI device being configured to broadcast a Bluetooth Low Energy (BLE) advertising message receivable by wireless devices according to fourth aspect and located in vicinity of the UI device In some embodiments, the UI device may be a Remote Control Appliance (RCA).

In some embodiments, the UI device may be a Personal Media Streaming Appliance (PMSA).

Advantageously, but not necessarily, the UI device may be configured to broadcast the BLE advertising message responsive to an occurrence of a vehicle operation, such as an engine start operation. As will be appreciated, the broadcasting of the BLE advertising message may thus occur responsive to at least one vehicle operation. As a non-limiting example, the at least one vehicle operation may include one or several of the following: a vehicle start operation (i.e., activation of the vehicle), a start operation of the air-conditioning (AC) system of the vehicle, a start operation of the head unit 84. Additionally, or alternatively, the broadcasting of the BLE advertising message may occur responsive to at least one of the following: a detected presence of a wireless device 118 in a vicinity of the vehicle 80, a detected presence of user (i.e. a human) in the cabin of the vehicle 80, a voice command from a user U.

In a sixth of its aspects, this disclosure presents a computer program, comprising instructions which, when executed on at least one processor, cause the at least one processor to carry out the method according to any one of the first, second or third aspects described above. A carrier containing the computer program of the sixth aspect may also be provided. The carrier may be one of an electronic signal, optical signal, radio signal, or non-transitory computer-readable storage medium.

The various aspects and embodiments described hitherto allow for an improved selection of a wireless device among at least one wireless device (i.e., one or more) being present in a vehicle at the same time. This disclosure recognizes the fact that BLE advertising messages can be advantageously utilized in the process of selecting or otherwise determining a correct or preferred wireless device from which media can be subsequently presented or played back. By broadcasting BLE advertising messages to wireless devices in the vicinity of the UI device (and thus typically in the vicinity of the cabin of the vehicle), the application modules of all wireless devices that received the broadcasted BLE advertising message will wake up (i.e., start) and authorize the UI device to remotely control media as presented by the application module of the wireless device in question. Hence, when many application modules at multiple wireless devices may be initiated for remote control at the same time the UI device will initially be authorized to remotely control media presentation as presented by all application modules of all wireless devices that received the broadcasted BLE advertising message. In addition, the application module of each one of the wireless devices that received the broadcasted BLE advertising message therefore also performs a checking operation to determine whether the wireless device in question is paired (i.e., in wireless connection) or is in a current cabled connection with the vehicle head unit of the vehicle. Upon a determination that the wireless device is paired or is in a current cabled (wired) connection with the vehicle head unit, this wireless device is selected or otherwise determined for subsequent communication with the UI device to enable the UI device to continue to remotely control the media presentation as presented by the application module of the wireless device. That is, the UI device is allowed or approved to continue remotely controlling media presentation as presented by the application module of the wireless device in questions. In other words, a wireless device with an active connection (wired or wireless) will be selected or otherwise determined for the subsequent remote control. Else, upon a determination that the wireless device is not paired with the vehicle head unit and is not in a current cabled connection with the vehicle head unit, the method proceeds by terminating the authorization of the UI device to remotely control media presentation as presented by the application module. By terminating the authorization of the UI device to remotely control media presentation as presented by the application module, the UI device will no longer be able to control media presentation as presented by the application module of the wireless device in question.

This enables a selection of a wireless device that is already in connection (i.e., wired through cable or wirelessly paired) with the vehicle head unit (aka the infotainment system or vehicle media playback system). Accordingly, any media played back as determined or controlled by the application module of the wireless device that is in connection with vehicle unit will be selected or chosen to be remotely controllable by the UI device. This allows for an efficient, yet automatic and user-friendly, set-up of communication between the vehicle head unit, the application module of the wireless device that is a current connection with the vehicle head unit and the separate and distinct UI device which is used to remotely control the media as presented by the application module of the wireless device identified to be controllable by the UI device.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

Figure 1:
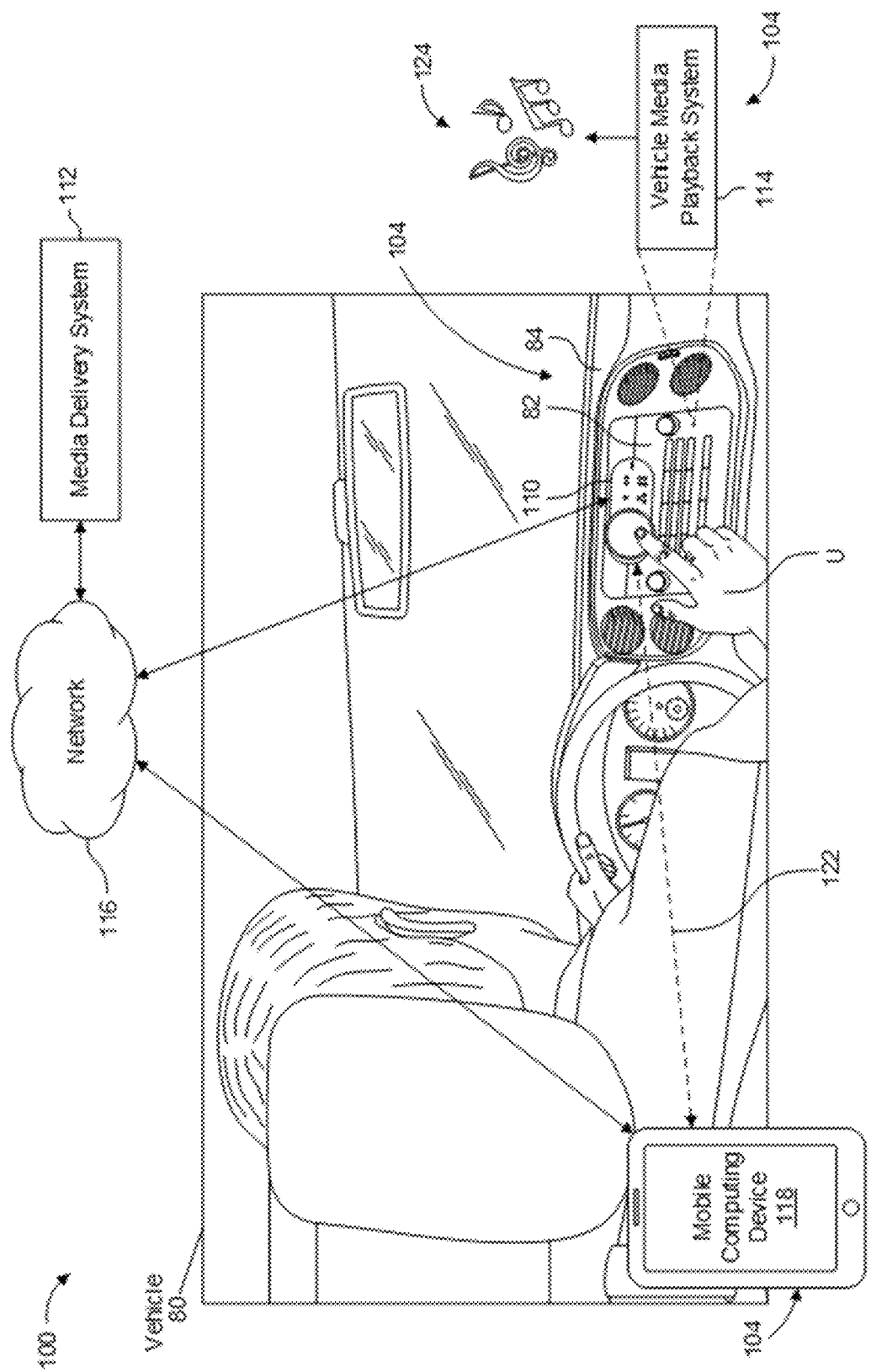
FIG. 1 illustrates an example system for streaming media content for playback.

EP 3 564 794 A1 has proposed the introduction of a UI device 110 (FIG. 1), or PMSA system, for remotely controlling media presentation as presented by a wireless device 118 (FIG. 1) through the vehicle head unit (FIG. 1) or infotainment system for media presentation or playback in the cabin of the vehicle 80 (FIG. 1). The vehicle 80 may be a vehicle of a traditional type using an engine such as an internal combustion engine (ICE) for propulsion. Alternatively, the vehicle 80 may be an electrical vehicle (EV), such as an electrical car, using e.g. an electric motor for propulsion. Still further, the vehicle may alternatively be a so called hybrid vehicle using two or more types of power.

As described earlier herein, there is a need for an improved way of selecting which wireless device(s) among one or several wireless devices that is/are to be used for remote control by the UI device. For example, the present disclosure recognizes that there exist scenarios when several users and their respective wireless devices (e.g., smartphones) are present in the vehicle at the same time. In such scenarios, there is a risk that the UI device 110 may connect to an incorrect or un-preferred wireless device if there are multiple users and, thus, wireless devices present in the vehicle at the same time. In such scenarios, there is a risk that the UI device will remotely control an application module of a wireless device that is actually not paired or which is not in a cabled (wired) connection with the vehicle head unit of the vehicle. This may be annoying to people who want to enjoy consuming media content while travelling in the vehicle.

To address this, in accordance with an aspect with continued reference to FIG. 1, described herein is a method for selecting a wireless device to be remotely controlled by a UI device for media presentation in a vehicle, the method comprising: a UI device 110 broadcasting a Bluetooth Low Energy (BLE) advertising message receivable by one or several wireless devices 118 located in vicinity of the UI device 110; responsive to a receipt of a broadcasted BLE advertising message from the UI device 110, waking up an application module of each one of the wireless devices 118 located in vicinity of the UI device 110; and in each one of said wireless devices 118: the application module authorizing the UI device to remotely control media presentation as presented by the application module; and the application module further initiating a checking operation to determine whether the wireless device 118 is paired (i.e. in a current wireless connection) or is in a current cabled connection a vehicle head unit (aka an infotainment system) of the vehicle 80; and upon a determination that the wireless device 118 is paired or is in a current cabled connection with the vehicle head unit, selecting or otherwise determining the wireless device 118 for subsequent communication with the UI device 110 to enable the UI device 110 to continue to remotely control the media presentation as presented by the application module of the wireless device 118; else upon a determination that the wireless device 118 is not paired with the vehicle head unit 84 and is not in a current cabled connection with the vehicle head unit 84, terminating the authorization of the UI device to remotely control media presentation as presented by the application module. By terminating the authorization of the UI device to remotely control media presentation as presented by the application module, the UI device will no longer be able to control media presentation as presented by the application module of the wireless device in question.

In other words, a wireless device with an active connection (wired or wireless) will be selected or otherwise determined for the subsequent remote control. This enables a selection of a wireless device that is already in connection (i.e., wired through cable or wirelessly paired) with the vehicle head unit (aka the infotainment system or vehicle media playback system). Accordingly, any media played back as determined or controlled by the application module of the wireless device that is in connection with vehicle unit will be selected or otherwise chosen to be remotely controllable by the UI device. This allows for an efficient, yet automatic, set-up of communication between the vehicle head unit, the application module of the wireless device that is in a current connection with the vehicle head unit and the separate and distinct UI device which is used to remotely control the media as presented by said application module of the wireless device. This also requires a minimum or at least a reduced number of operations or actions from the user(s) that is/are present in the vehicle to identify and select the "right" application module from which media is to be presented or played back when enjoying media content 124 in the vehicle 80 (FIG. 1). Hence, the user-friendliness is improved and the cognitive load can be reduced.

Figure 2:
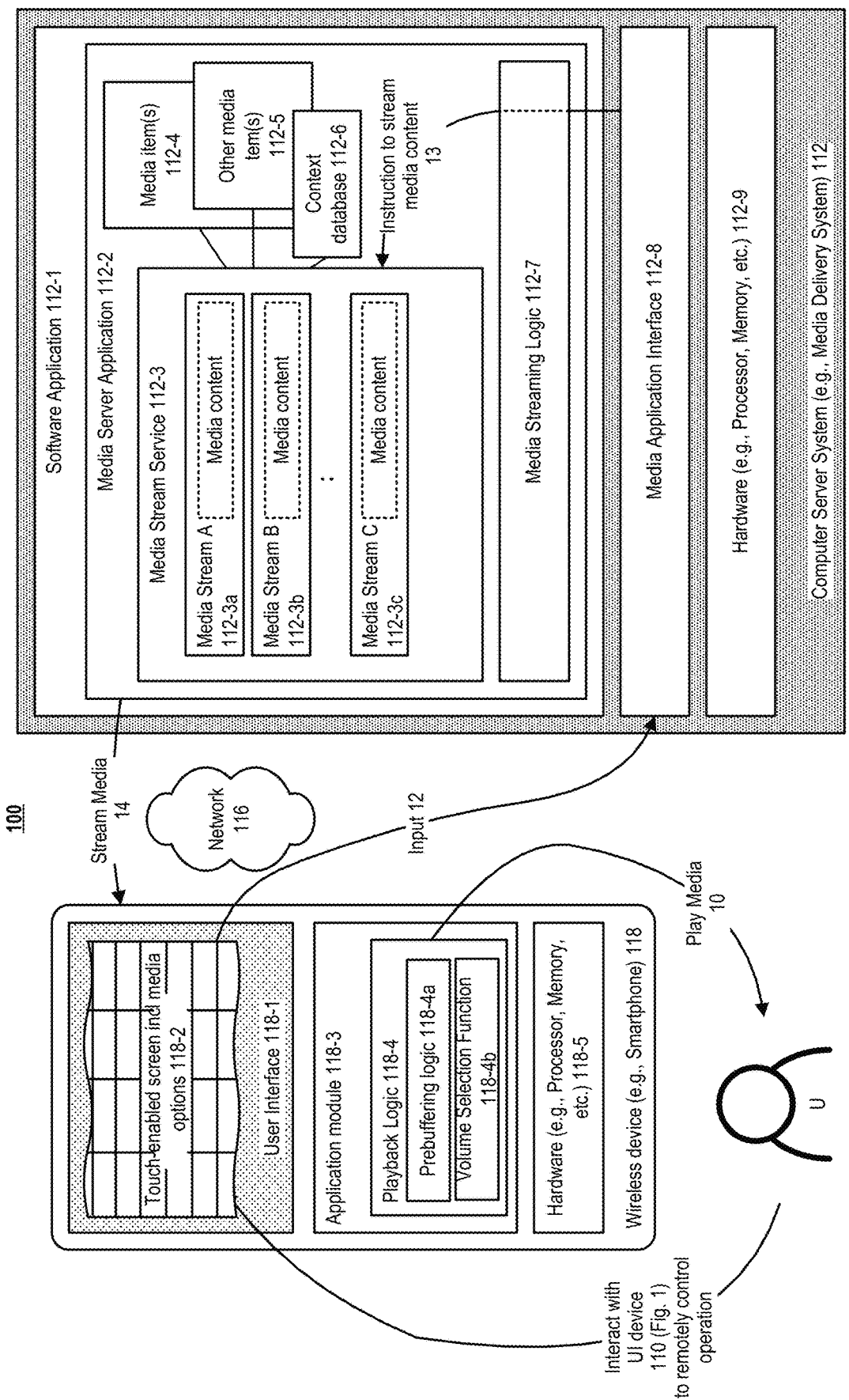
FIG. 2 illustrates an example of a client-server environment for playback of streamed media content.

Reference is now made to FIG. 2, in conjunction with FIG. 1. The description in connection with FIG. 2 in conjunction with FIG. 1 is intended to introduce a possible environment where aspects and embodiments described herein may be reduced to practice.

FIG. 2 illustrates an example client-server environment 100 for playback of streamed media content. In the following description, reference will mainly be made to streamed audio content. However, this should not be construed as limiting. Instead, it should be appreciated that the media content could be any media content, e.g. including visual content such as video content, etc.

The client-server environment 100 may include a wireless device 118 (sometimes referred to as a media device) and a computer server system 112, e.g. operating as a media content delivery system. The media content delivery system 112 may comprise one single computer or several computers. Hence, it will be appreciated that the computer server system 112 may be realized in a distributed computing environment.

The wireless device may be communicatively connectable to the media content delivery system 112 via a network 116, such as the Internet. As can be seen in FIG. 2, only a single wireless device 118 and a media content delivery system 112 are shown. However, the media content delivery system 112 may support the simultaneous use of multiple wireless devices 118, and/or the wireless device 118 can simultaneously access media content at multiple media content delivery systems 112.

As shown in FIG. 2, the wireless device may be used for the playback of media content such as audio content (e.g., music), which is provided by the media content delivery system 112. The wireless device 118 may be a portable communication device (e.g. a mobile telephone such as a smartphone). Alternatively, the wireless device 118 may be a tablet computer. In yet other embodiments, the wireless device 118 may be any other wireless device capable of playback of media content such as, for example, one of the media devices of the following group: a personal computer, a laptop computer, a head-mounted device (e.g. AR glasses) and a mobile media device (e.g. a handheld entertainment device, a digital media player, or other media device).

The wireless device 118 may include one or several physical computer resources, or hardware resources 118-5. The hardware resources 118-5 may e.g. include one or several processors (or, processing circuitry), a communications interface (or, communication circuitry) and one or several memories.

Likewise, the media content delivery system 112 may include one or several physical computer resources, or hardware resources 112-9. The hardware resources 112-9 may likewise include e.g. one or several processors (or, processing circuitry), a communications interface (or, communication circuitry) and one or several memories.

The media content delivery system 112 may include an operating system or other processing system that supports execution of a software application 112-1, including a media server application 112-2, which may be used, for example, to stream media content (e.g., audio content such as music or podcasts). A media stream service 112-3 may be used to buffer media content, for streaming to one or more media streams 112-3a, 112-3b, 112-3c, etc. A media application interface 112-8 may receive requests from client device(s)

such as wireless device 118 or other systems, to retrieve media content 112-4, 112-5 from the computer server system 112.

Media content, or media items 112-4, 112-5, may be provided, for example, within a storage such as a memory (e.g., including a database), or may be received by the media content delivery system 112 from another source (not shown). This another source (not shown) could be external to the media content delivery system 112, i.e. it may be located remotely from the media content delivery system 112.

Furthermore, a context database 112-5 may optionally be provided to store data associated with the presentation of media items by the wireless device 118. For example, the context databases may, e.g., include current position data within a certain media stream that is being presented or otherwise played by the wireless device 118. Additionally, or alternatively, the context database may include playlist information associated with a certain media stream.

A media streaming logic 112-7 may be used to retrieve or otherwise access the media items 112-4, 112-5 in response to requests from wireless devices 118 or other systems, and populate the media stream service with streams 112-3a, 112-3b, 112-3c of corresponding media content data that may be returned, i.e. streamed, to the requesting wireless device 118.

The wireless device comprises a user interface (UI) 118-1, which may advantageously be adapted to display or otherwise provide a visual array of media options 118-2, for example as a two-dimensional grid, a list, or other visual format, and determine a user input from user U. Each media option in the visual array of media options 118-2 may correspond to a respective media stream 112-3a, 112-3b, 112-3c. As will be appreciated, the UI 230 may preferably, but not necessarily, comprise a touch-enabled display screen. Selecting a particular media option within the visual array 118-2 may be used, or otherwise interpreted, as a request or instruction to the media server application 112-2 to stream or otherwise return a corresponding particular media item to the wireless device 118. For example, in accordance with some embodiments, the software application 112-1 at the computer server system 112 may be used to stream or otherwise communicate media content to the wireless device 118, wherein the UI 112-1 at the wireless device 118 is adapted to display a plurality of media options that correspond to respective media streams.

Optionally, the UI 230 may additionally and advantageously comprise a voice-enabled interface to determine user input from the user U.

In accordance with some embodiments, the wireless device 118 may also include a media playback application or application module 118-3, together with a playback logic 118-4, and optionally a pre-buffering logic 118-4a and a volume selection function 118-4b, etc. The application module 118-3 may be used to control the playback of media content that is received from the media server application 112-2, e.g. for playback by the wireless device 118.

As will be appreciated, the user U may interact 11 with the user interface 118-1 of the wireless device 118 and issue requests (or request messages), for example the playing of an audio item (e.g., a piece of music) associated with a selected media option at the wireless device. Alternatively, the user may instead use the UI device 110 (FIG. 1) to remotely control the operation of the wireless device 118. In more detail, the user may use the UI device 110 (FIG. 1) to remotely interact 11 with application module 118-3 of the wireless device 118 and issue requests (or request messages), for example the playing of an audio item (e.g., a piece of music) associated with a selected media option at the wireless device. For example, a user's selection of a particular media option may be communicated 12 to the media server application 112-2, via the media application interface 112-8. The media server application 112-2 may then be instructed 13 to stream a corresponding media item, including one or more streams of media content data 112-3a, 112-3b, 112-3c, and subsequently stream 14 or otherwise communicate the selected media to the user's media device 200. In accordance with some embodiments, pre-buffering requests from the wireless device 118 may also be communicated 12 to the media server application 112-2 via the media application interface 112-8. At the wireless device 112-2, in response to the user's interaction with the user interface 118-1 or remotely via the UI device 110 (FIG. 1), the application module 118-3, including the playback logic 118-4, may play 10 the requested, and thus selected, media content to the user U. If the wireless device is in a current connection (wirelessly paired or in a cabled connection) with a vehicle head unit (aka infotainment system or vehicle media playback system) of vehicle 80 (FIG. 1), the selected media can be further communicated to the connected vehicle head unit for playback of the selected media in the cabin of the vehicle 80.

Figure 3:
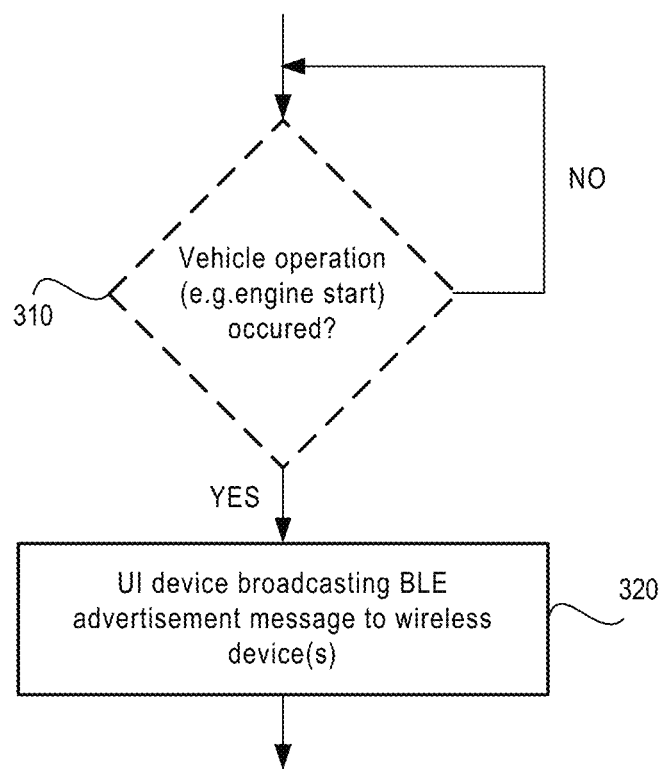
FIG. 3 illustrates a flowchart of a method performed by a UI device in accordance with an embodiment.
Figure 4:
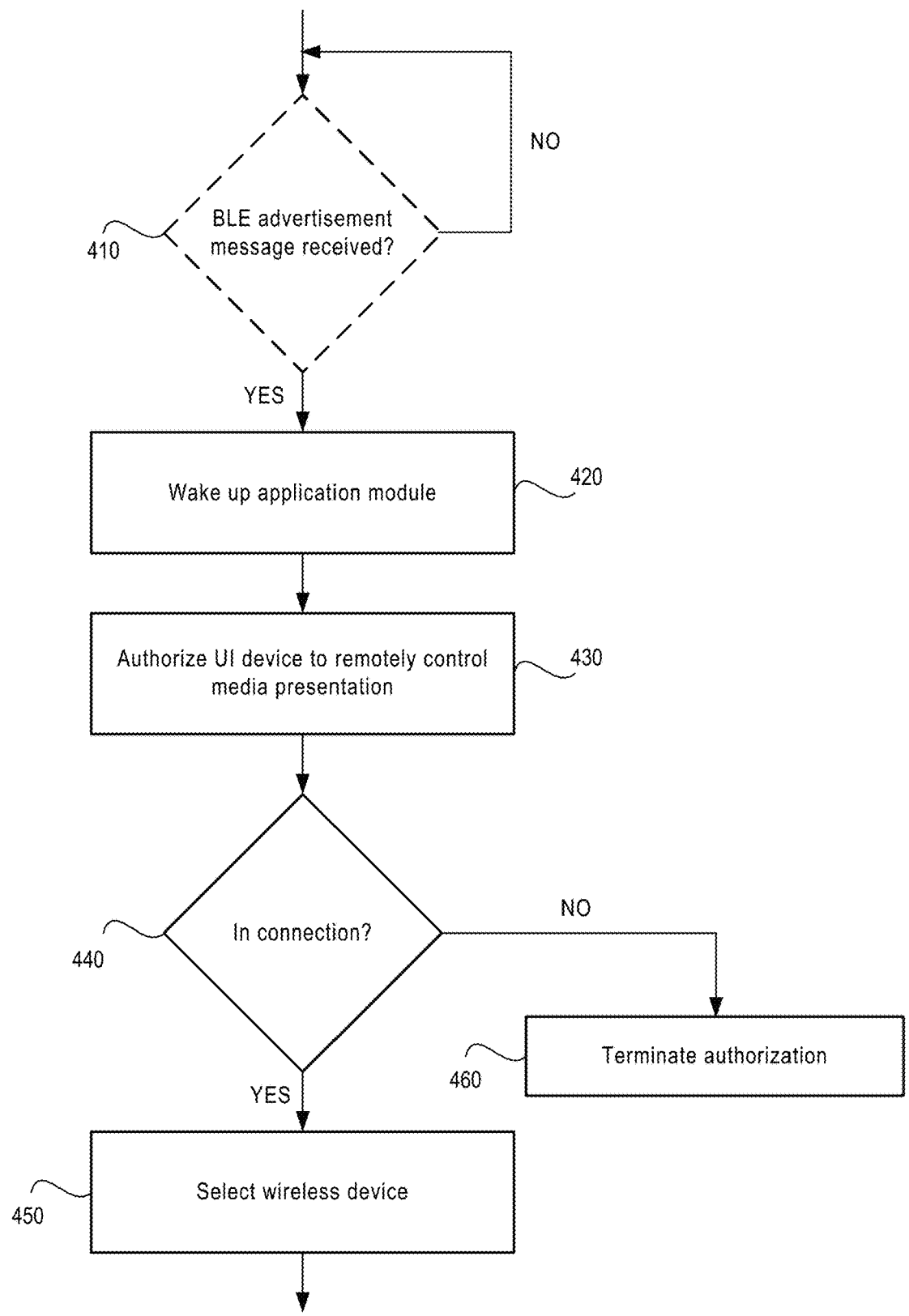
FIG. 4 illustrates a flowchart of a method performed by a wireless device in accordance with an embodiment.

Reference is now made to FIGS. 3 and 4 together with FIGS. 1 and 2, which have been described hitherto. FIG. 3 illustrates a flowchart of a method performed by a UI device 110 (FIG. 1) in accordance with an example embodiment. FIG. 4 illustrates a flowchart of a method performed by a wireless device (FIGS. 1 and 2) in accordance with an example embodiment.

It should be appreciated that the actions do not necessarily have to be performed, or otherwise executed, in the exact order as will be described with reference to FIGS. 3 and 4. However, in advantageous implementations, the actions may be performed in the exact order as will described with reference to FIGS. 3 and 4.

Action 310: Optionally, it is determined whether a vehicle operation has occurred. For example, the vehicle operation may advantageously be a vehicle start operation (i.e., activation of the vehicle). In some implementations, the vehicle start operation may be an engine start operation.

Action 320: A BLE advertising message is broadcasted, i.e. transmitted, to wireless device(s) located in vicinity of the UI device 110. The BLE advertising message is generally receivable by any wireless device 118 that is in vicinity, i.e. within the short-range specified for BLE advertising messages, of the UI device 110. That is, any wireless device within the cabin of the vehicle 80 or in close proximity of the vehicle (not necessarily inside the cabin of the vehicle 80) may typically receive a BLE advertising message broadcasted by the UI device 110.

In advantageous embodiments, action 320 is made conditional on action 310. That is, the BLE advertising message is broadcasted only responsive to a determination that the vehicle operation (e.g., vehicle start operation (i.e., activation of the vehicle)) occurred. In such embodiments, the BLE advertising message may be triggered, or otherwise initiated, by the occurrence of the vehicle operation. For example, and in some embodiments, when a driver starts the engine of the vehicle, this will trigger or otherwise initiate the broadcasting of said BLE advertising message by the UI device 110 to any nearby wireless device 118. This has the advantage of making the triggering or initiation of the broadcasting of the BLE message increasingly automatic. In addition, this may save resources as the signaling (or broadcasting) of the BLE advertising message only has to be performed upon a determination that the vehicle operation (e.g. vehicle start operation (i.e., activation of the vehicle)) actually occurs.

Action 410: It may be determined, or otherwise concluded, whether the wireless device 118 has received a broadcasted BLE advertising message from the UI device 110.

Action 420: Responsive to a receipt of a broadcasted BLE advertising message from a UI device 110, an application module of the wireless device 118 is woken or otherwise started.

Action 430: If, or when, an application module has been woken or otherwise started in action 420, the application module authorizes the UI device 110 from which it received the broadcasted BLE advertising message to remotely control media presentation as presented by the application module. This authorization procedure may, for instance, be performed in accordance with known BLE handshaking techniques between the UI device 110 and the application module 118-3 of the wireless device 118 in question.

In some embodiments, the application module may authorize the UI device 110 to remotely control media presentation as presented by the application module wirelessly by means of Bluetooth technology, e.g. Classic Bluetooth. Other short range technologies may also be conceived.

Action 440: In addition, the application module initiates (e.g., after authorizing the UI device 110 to remotely control media presentation) a checking operation to determine whether the wireless device 118 is paired (i.e., is in a current wireless connection) or is in a current cabled connection with said vehicle head unit 84 of the vehicle 80.

In some embodiments, the checking operation to determine whether the wireless device 118 is paired includes a checking operation to determine whether the wireless device 118 is wirelessly paired with said vehicle head unit of the vehicle 80 by means of Bluetooth technology.

In some embodiments, the checking operation to determine whether the wireless device is in a current cabled connection includes a checking operation to determine whether the wireless device 118 is in a current cabled connection with said vehicle head unit 84 of the vehicle 80 via a USB connection.

Action 450: If, or when, it is determined that the wireless device 118 is paired or is in a current cabled connection with the vehicle head unit of the vehicle, the wireless device 118 is selected or otherwise chosen or determined for subsequent communication with the UI device 110 to enable the UI device 110 to continue to remotely control the media presentation as presented by the application module of the wireless device.

Action 460: If, or when, it is determined that the wireless device 118 is not paired with the vehicle head unit and is not in a current cabled connection with the vehicle head unit 84, the authorization of the UI device 110 to remotely control media presentation as presented by the application module is terminated.

As will be appreciated, there exist situations where several wireless devices 118 (i.e. two are more wireless devices) may receive control requests, or control commands, from the UI device 100 after action 430 but before action 440 is complete. As will be appreciated upon reading this disclosure, the control request, or control command, may be a request or command for remotely controlling the media presentation as presented by the application module. In some embodiments, the wireless device 118 may therefore be configured to process a received control request, or control command, only after action 440 is completed. In other words, the application module of the wireless device 118 may be configured to await the processing of a received control request, or control command, until checking operation has been completed. Or said differently, the wireless device may be configured such that processing of a received control request or control command from the UI device 110 is not initiated by the wireless device 118 (or the application module thereof) until the checking operation in action 440 has been completed. Upon a determination that the wireless device 118 is paired or is in a current cabled connection with the vehicle head unit 84, the selection in action 450 the wireless device 118 for subsequent communication with the UI device 110 to enable the UI device 110 to continue to remotely control the media presentation as presented by the application module of the wireless device 118 may then include acknowledging (ACK) or otherwise approving to initiate processing of the received control request, or control command. In addition, the wireless device 118 may optionally be configured to return an ACK message to the UI device 110 to inform the UI device that the wireless device 118 in question accordingly. Else, upon a determination that the wireless device 118 is not paired with the vehicle head unit 84 and is not in a current cabled connection with the vehicle head unit 84, the termination in action 460 of the authorization of the UI device to remotely control media presentation as presented by the application module may then include refusing or otherwise disapproving to acknowledge the received control request, or control command. In addition, the wireless device 118 may optionally be configured to return a negative acknowledgement (NACK) message to the UI device 110 to inform the UI device that the wireless device 118 in question will not process the earlier-received control request or command.

As will be appreciated from the above, a wireless device 118 having an active connection (wired or wireless) will be selected or otherwise determined for the subsequent remote control. This enables a selection of a wireless device that is already in connection (i.e., wired through cable or wirelessly paired) with the vehicle head unit (aka the infotainment system or vehicle media playback system). Accordingly, any media played back as determined or controlled by the application module 118-3 of the wireless device 118 that is in connection with the vehicle unit will be selected or otherwise chosen to be remotely controllable by the UI device 110. This allows for an efficient, yet automatic, set-up of communication between the vehicle head unit, the application module 118-3 of the wireless device 118 that is in a current connection with the vehicle head unit and the separate and distinct UI device 110 which is used to remotely control the media as presented by said application module 118-3 of the wireless device 118.

Figure 5:
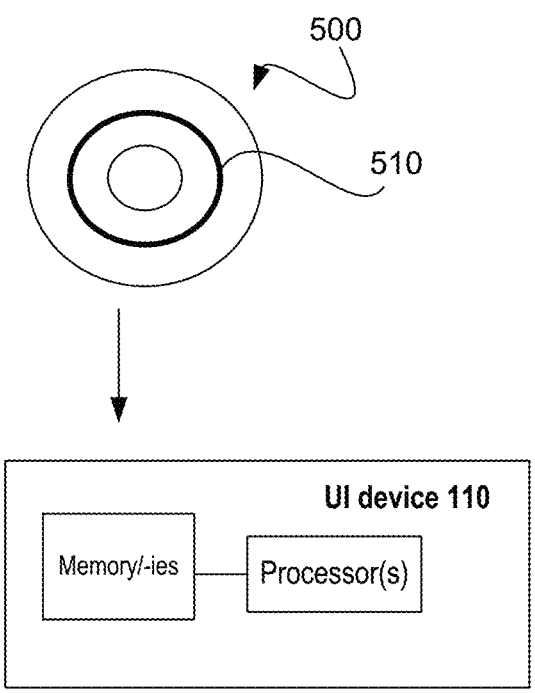
FIG. 5 illustrates a carrier containing a computer program, in accordance with an embodiment.

Turning now to FIG. 5, another aspect will be briefly discussed. FIG. 5 shows an example of a computer-readable medium, in this example in the form of a data disc 500. In one embodiment, the data disc 500 is a magnetic data storage disc. The data disc 500 is configured to carry instructions 510 that can be loaded into a data storage (e.g., memory) of an apparatus (e.g., UI device 100 in FIG. 1). Upon execution of said instructions by a processor of the apparatus, the apparatus is caused to execute a method or procedure as described in connection with FIG. 3. The data disc 500 is arranged to be connected to or within and read by a reading device (not shown), for loading the instructions into the processor. One such example of a reading device in combination with one (or several) data disc(s) 500 is a hard drive. It should be noted that the computer-readable medium can also be other mediums such as compact discs, digital video discs, flash memories or other memory technologies commonly used. In such an embodiment, the data disc 500 is one type of a tangible computer-readable medium. The instructions may alternatively be downloaded to a computer data reading device, such as a computer or other media device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 6:
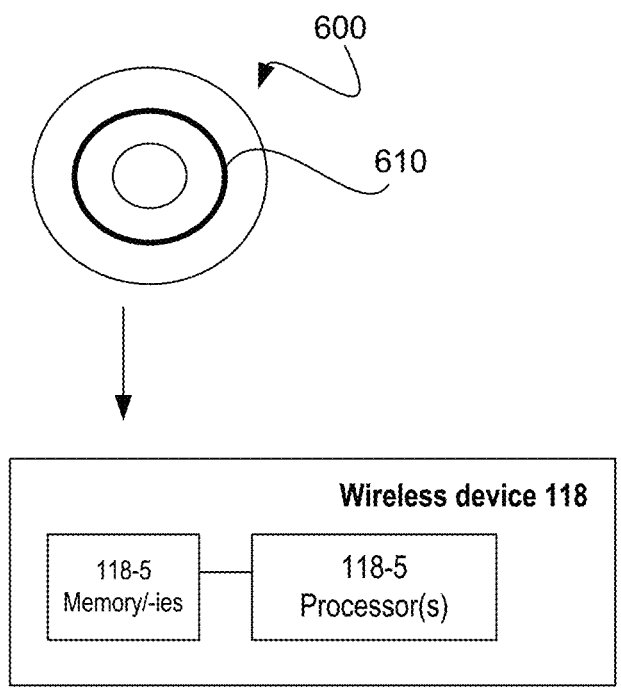
FIG. 6 illustrates a carrier containing a computer program, in accordance with another embodiment.

Turning now to FIG. 6, another aspect will be briefly discussed. FIG. 6 shows an example of a computer-readable medium, in this example in the form of a data disc 600. In one embodiment, the data disc 600 is a magnetic data storage disc. The data disc 600 is configured to carry instructions 610 that can be loaded into a data storage (e.g., memory) of an apparatus (e.g., wireless device 118 in FIGS. 1 and 2). Upon execution of said instructions by a processor of the apparatus, the apparatus is caused to execute a method or procedure as described in connection with FIG. 4 (or, alternatively, FIG. 9). The data disc 600 is arranged to be connected to or within and read by a reading device (not shown), for loading the instructions into the processor. One such example of a reading device in combination with one (or several) data disc(s) 600 is a hard drive. It should be noted that the computer-readable medium can also be other mediums such as compact discs, digital video discs, flash memories or other memory technologies commonly used. In such an embodiment, the data disc 600 is one type of a tangible computer-readable medium. The instructions may alternatively be downloaded to a computer data reading device, such as a computer or other media device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 7:
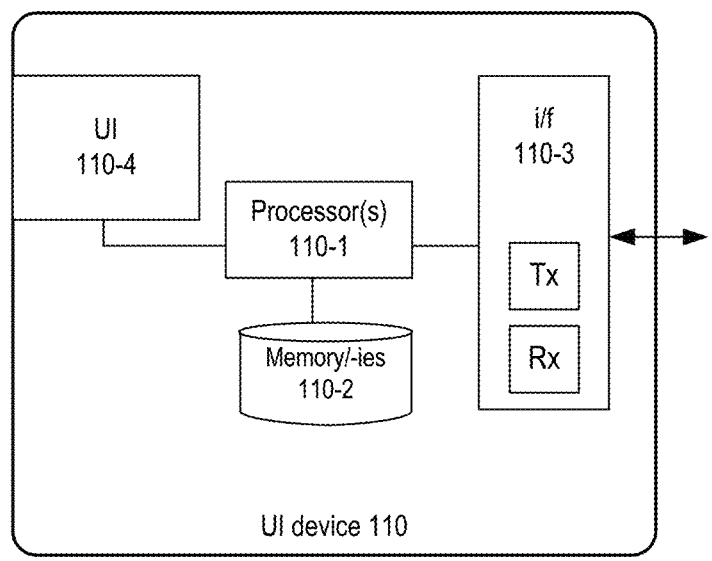
FIG. 7 illustrates an example implementation of an embodiment of a UI device.

With reference to FIG. 7, an example implementation of the UI device of FIG. 1 will be described in some further detail. The UI device 110 is operable as a media playback control assembly. For example, the UI device 110 may be a Remote Control Appliance (RCA) for remotely controlling the media presentation as presented by an application module 118-3 of a wireless device 118. Alternatively, the UI device 110 may be embodied as a Personal Media Streaming Appliance (PMSA). An example of a PMSA system has been described in EP 3 564 794 A1 and will not be described in further detail herein. Still further, the UI device 110 may additionally or alternatively be embodied as a voice-enabled speaker system or display device. Moreover, the UI device 110 may have wired and/or wireless media streaming capability in certain implementations.

The UI device 110 is mountable at a structure of a vehicle 80 (FIG. 1). As such, the UI device 110 is separate and distinct from the vehicle head unit 84 of the vehicle 80. For example, the UI device 110 may be mounted at a structure of the vehicle 80 according to the disclosure of the international patent application no. PCT/EP2020/061955. The UI device 110 is configured to execute, or otherwise perform, the method described with reference to FIG. 3.

As is schematically illustrated in FIG. 7, the UI device 110 may comprise hardware resources 110-1, 110-2, 110-3. For example, the UI device 110 may comprise one or more processors 110-1 and one or more memories 110-2. Also, a communications interface 110-3 may be provided in order to allow the UI device 110 to communicate with other devices, such as the wireless device 118. To this end, the communications interface 110-3 may comprise a transmitter (Tx) and a receiver (Rx). Alternatively, the communications interface 110-3 may comprise a transceiver (Tx/Rx) combining both transmission and reception capabilities. The communications interface 110-3 may include a radio frequency (RF) interface allowing the UI device to communicate with other devices through a radio frequency band through the use of different radio frequency technologies such as 5G, 4G, 3G, 2G or any other cellular network standardized by the 3rd Generation Partnership Project (3GPP), or any other wireless technology such as short-range technologies such as Wi-Fi, WiMax, Bluetooth®, ZigBee, Near-Field Communication (NFC), etcetera. The UI device 110 may further comprise a user interface 110-4. For example, the user interface 110-4 may advantageously include a touch-sensitive display. As such, the touch-sensitive display may be a touch screen display upon which virtual keys may be displayed and operated. Additionally, or alternatively, the user interface 110-4 is operable to issue and/or receive voice commands. As will be appreciated, a user U may remotely control media presentation as presented or otherwise played back by an application module 118-3 of a wireless device 118 by interacting and operating the user interface 110-4 of the UI device 110.

In some implementations, the at least one memory 110-2 comprises instructions executable by the at least one processor 110-1 whereby the UI device 100 is operative to broadcast a BLE advertising message receivable by one or several wireless devices 118 located in vicinity of the UI device 110.

In an advantageous implementation, the at least one memory comprises instructions executable by the at least one processor 110-1 whereby the UI device 100 is operative to broadcast the BLE advertising message responsive to an occurrence of a vehicle operation, such as a vehicle start operation (i.e., activation of the vehicle).

Figure 8:
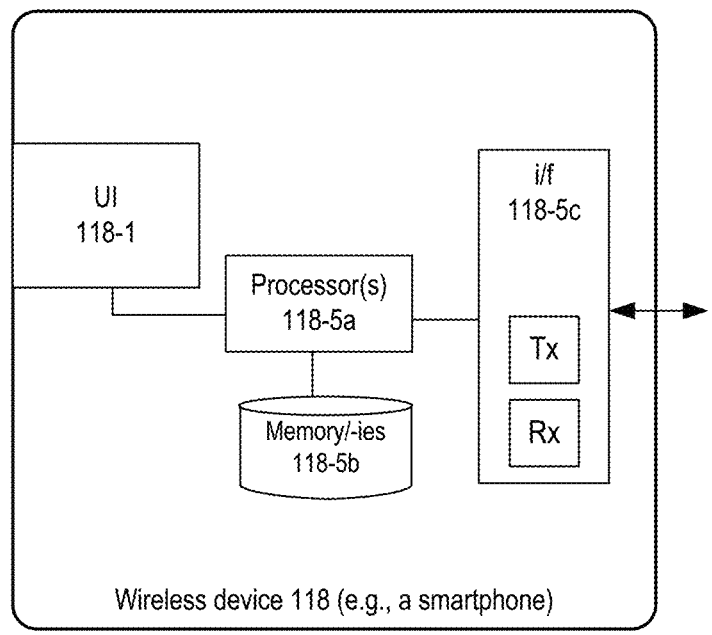
FIG. 8 illustrates an example implementation of an embodiment of a wireless device exemplified in FIG. 2.

With reference to FIG. 8, an example implementation of the wireless device 118 of FIGS. 1 and 2 will be described in some further detail. The wireless device 118 shown in FIG. 8 is configured to execute, or otherwise perform, the method as described with reference to FIG. 4 (or, alternatively, FIG. 9, which will be described in further detail later in this disclosure). FIG. 8 illustrates an example implementation of the wireless device 118. As will be appreciated, the wireless device may be embodied as a portable communication device or user equipment (e.g., a cellular telephone, a smartphone, a tablet computer, or the like).

As is schematically illustrated in FIG. 8, the wireless device 118 comprises hardware resources 118-5. For example, the wireless device 118 may comprise one or more processors 118-5a and one or more memories 118-5b. Also, a communications interface 118-5c may be provided in order to allow the wireless device 118 to communicate with other devices, such as other wireless devices 118 and/or computer server systems 300, e.g. via a network 116 such as the Internet. To this end, the communications interface 118-5c may comprise a transmitter (Tx) and a receiver (Rx). Alternatively, the communications interface 118-5c may comprise a transceiver (Tx/Rx) combining both transmission and reception capabilities. The communications interface 118-5c may include a radio frequency (RF) interface allowing the wireless device 118 to communicate with other devices such as other wireless devices 118 and/or computer server systems 300 through a radio frequency band through the use of different radio frequency technologies such as 5G, 4G, 3G, 2G or any other cellular network standardized by the 3rd Generation Partnership Project (3GPP), or any other wireless technology such as Wi-Fi, WiMax, Bluetooth®, Zigbee, Near-Field Communication (NFC), etcetera. The wireless device 118 may further comprise a user interface (UI) 118-1, as described earlier herein. For example, the user interface 118-1 may advantageously include a touch-sensitive display. As such, the touch-sensitive display may be a touch screen display upon which virtual keys may be displayed and operated. Furthermore, the user interface 118-1 may include output means such as loudspeakers (not shown). Also, the wireless device 118 may optionally comprise a location-determining device (not shown), such as a positioning device (e.g. a GPS device) for determining a position and hence the location of the wireless device 118. Furthermore, the wireless device 118 may comprise a timer (not shown) or timer functionality. Still further, an audio recording device (not shown) such as a microphone may optionally be provided for recording audio. Also, and as described with reference to FIG. 2, the wireless device 118 may comprise at least one application module 118-3. The at least one application module 118-3 may include sets of instructions (e.g., computer program code) that when executed by the one or more processors 118-5 of the wireless device 118 controls the operation of the application module 118-3.

In the example implementation shown in FIG. 8, the at least one memory 118-5*b* comprises instructions executable by the at least one processor 118-5*a* whereby the wireless device 118 is operative to: responsive to a receipt of a broadcasted BLE advertising message from a UI device 110, waking up or otherwise starting the application module 118-3 of the wireless device 118; authorizing, by the application module 118-3, the UI device 110 to remotely control media presentation as presented by the application module 118-3; and initiating, by the application module 118-3, a checking operation to determine whether the wireless device 118 is paired or is in a current cabled connection with said vehicle head unit of the vehicle 80; and upon a determination that the wireless device 118 is paired or is in a current cabled connection with the vehicle head unit, selecting the wireless device 118 for subsequent communication with the UI device 110 to enable the UI device 110 to continue to remotely control the media presentation as presented by the application module of the wireless device; else upon a determination that the wireless device 118 is not paired with the vehicle head unit and is not in a current cabled connection with the vehicle head unit 84, terminating the authorization of the UI device 110 to remotely control media presentation as presented by the application module.

In some implementations, the application module 118-3 is operative to authorize the UI device 110 to remotely control media presentation as presented by the application module 118-3 wirelessly by means of Bluetooth technology.

In some implementations, the application module 118-3 is operative to initiate a checking operation to determine whether the wireless device is paired includes a checking operation to determine whether the wireless device is wirelessly paired by means of Bluetooth technology.

In some implementations, the application module 118-3 is operative to initiate a checking operation to determine whether the wireless device is in a current cabled connection includes a checking operation to determine whether is in a current cabled connection with said vehicle head unit of the vehicle via a Universal Serial Bus (USB) connection.

As described herein, the various aspects and embodiments described in this disclosure allow for an improved way of selecting a wireless device (among one or several wireless devices) for the remote control of media presentation as determined by an application module of the selected wireless device when presenting or otherwise playing back media, such as music, in a vehicle environment—e.g. through the vehicle head unit (aka infotainment system or vehicle media playback system) of the vehicle.

This may be advantageous in various scenarios. For instance, and as described herein, there exist scenarios where several users are present in the vehicle, such as a car, at the same time. In such scenarios, there is a risk that an UI device used to remotely control the operation of application modules of wireless devices may connect to an incorrect or un-preferred wireless device if there are multiple users and, thus, multiple wireless devices present in the vehicle at the same time. In such scenarios, there is evidently a risk that the UI device will begin remotely controlling an application module of a wireless device that is actually not paired or not in a cabled connection with the vehicle head unit of the vehicle.

The technology described herein proposes example embodiments where the UI device, which is typically mounted at a structure of the vehicle 80 (e.g., using one or more of the following: a magnetic-based mounting system, a suction-based mounting system, any of the principles described in the disclosure of the international patent application no. PCT/EP2020/061955), broadcasts a BLE advertising message (e.g., responsive to a vehicle operation such as a vehicle start operation (i.e., activation of the vehicle)). This BLE advertising message can be received by all wireless devices 118 within the range defined for BLE advertising messages, which means that the broadcasted BLE message is receivable by wireless devices 118 in vicinity of the UI device 110 (and hence in proximity with the vehicle 118). The technology further proposes that any woken, or otherwise started, application module of those wireless device that received the BLE advertising message initiates a checking operation to check whether the wireless device 118 in question is already paired (e.g., having an active wireless connection) or in a cabled connection with the vehicle head unit 84 of the vehicle. According to the embodiments described herein, a wireless device 118 which is paired or is in cabled connection with the vehicle head unit 84 will be selected or otherwise determined for the subsequent remote control. This enables a selection of a wireless device that is already in connection (i.e., wired through cable or wirelessly paired) with the vehicle head unit (aka the infotainment system). Accordingly, any media played back as determined or controlled by the application module of the wireless device that is in already in connection with vehicle unit will be selected or otherwise chosen or determined to be remotely controllable by the UI device. This allows for an efficient, yet automatic and user-friendly, set-up of communication between the vehicle head unit, the application module of the wireless device that is in a current connection with the vehicle head unit and the separate and distinct UI device which is used to remotely control the media as presented by said application module of the wireless device. If or when it is determined that a wireless device that received the BLE advertising message is not paired (e.g., not previously paired or not in active wireless connection) and is also not in a cabled connection with the vehicle head unit, the application module will terminate the earlier authorization for the UI device to remotely control media presentation as presented by this application module. The embodiments described herein therefor allows for a non-complex and efficient way of identifying and selecting or otherwise determining a proper wireless device (among one or several wireless devices) for the continued remote control of media presentation as determined by the application module of the wireless device for further communication with the vehicle head unit for presenting or otherwise playing back the media presentation through the vehicle head unit of the vehicle.

There may exist situations where it is possible that more than one wireless device, e.g. two wireless devices, are either paired or in cabled connection with the vehicle head unit of the vehicle at the same time. In such scenarios, the application module may apply a priority scheme to determine which one of the identified wireless devices to select for the continued remote control. For example, in some embodiments, the applications module gives a cabled connection priority over wireless connection(s). In alternative embodiments, the applications module gives a wirelessly paired connection priority over cabled, i.e., a wired connection. The exact priority scheme to be applied should preferably be tested and evaluated for each specific case, e.g. in dependence of user need or system requirements. In still other implementations, the UI device 110 may be configured to prompt a user selection. For example, the UI device 110 may be configured to request the user to select only one device of interest to be controlled by the UI device. For example, the UI device 110 may be configured to receive the user's selection through the UI 110-4 of the UI device 110 (FIG. 7). The exact implementation of this prompting procedure should preferably be tested and evaluated for each specific case, e.g. in dependence of user needs or system requirements.

There also exist situations where it is possible that the communication between the selected wireless device 118 and the UI device 110 is lost or otherwise discontinued. An example could be when a user U leaves the vehicle 80 and brings his/her wireless device when leaving the vehicle 80. In such situation, it is conceivable to repeat the methods as described in FIGS. 3 and 4 (or FIG. 9, which will be described later in this disclosure) until a new wireless device 118 is found, or otherwise selected, to be remotely controlled by the UI device 110. Additionally, or alternatively, if more than one wireless device were already in connection (either wired or wirelessly) and if a priority scheme is applied as described above, it is conceivable that the application module selects a new wireless device among the already connected devices by applying its priority scheme.

In the following, an example use case scenario utilizing a music streaming service such as Spotify® and the technology described hitherto will be described in order to elucidate the achieved advantages even further. The UI device 110 may e.g. act as a playback control assembly for remotely controlling an application module (e.g. a media playback application such as a Spotify App.) running on a wireless device 118. The intended music playback device may be the vehicle head unit 84 (infotainment system/vehicle media playback system) of the vehicle. For example, the media as presented by the application module may be communicated (e.g., wirelessly utilizing Bluetooth technology or in a wired manner utilizing a USB cable or similar) for presentation or playback by means of the vehicle head unit 84 (aka infotainment system or vehicle media playback system) in the cabin of the vehicle. For example, upon a vehicle start operation (i.e., activation of the vehicle) the UI device can be operable to power up and broadcast the BLE advertising messages to any wireless device that is/are in vicinity of the UI device. The application module (Spotify app) has subscribed to BLE advertising messages such that the wireless device 118 on which the application module is running is operable to receive BLE advertising messages from the UI device 110. Hence, wireless devices 118 will scan for the BLE advertising messages. For example, as soon as a wireless device 118 receives a BLE advertising message from the UI device 110 this will wake up the application module (Spotify App). Subsequently, the application module (Spotify App) can additionally initiate the earlier-described checking operation to determine whether the wireless device on which the application module is running is paired (wireless connection) or is in a cabled connection with the vehicle head unit. If or when it is determined that the wireless device 118 is paired or is in a current cabled connection with the vehicle head unit of the vehicle, the wireless device 118 is selected or otherwise chosen or determined for subsequent communication with the UI device 110 to enable the UI device 110 to continue its remote control of the media presentation as presented by the application module of the wireless device and played back at the vehicle head unit (aka infotainment system or vehicle media playback system). If, or when, it is determined that the wireless device 118 is not paired with the vehicle head unit and is not in a current cabled connection with the vehicle head unit 84, the authorization of the UI device to remotely control media presentation as presented by the application module will instead be terminated.

Again, a procedure as exemplified above enables a selection of a wireless device that is already in connection (i.e., wired through cable or wirelessly paired) with the vehicle head unit (aka the infotainment system/vehicle media playback system). The proposed procedure allows for an efficient, yet automatic and user-friendly, set-up of communication between the vehicle head unit, the application module of the wireless device that is in a current connection with the vehicle head unit and the separate and distinct UI device which is used to remotely control the media as presented by said application module of the wireless device. The procedure for identifying and selecting or otherwise determining which wireless device that is to be controlled by the UI device also requires minimum or little interaction by the users that are present in the vehicle.

Figure 9:
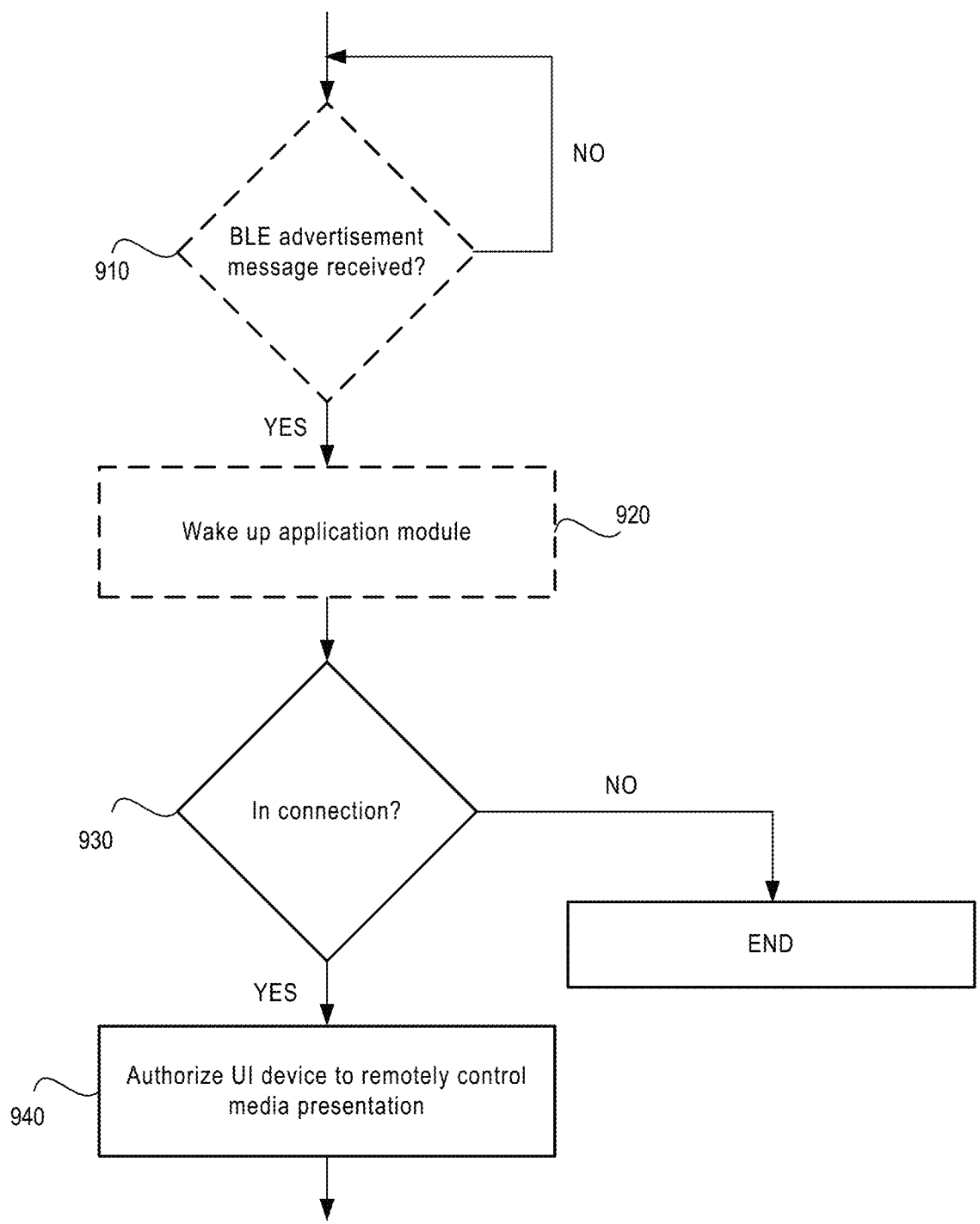
FIG. 9 illustrates a flowchart of a method performed by a wireless device in accordance with an alternative embodiment.

As will be appreciated, the various aspects and embodiments disclosed hitherto provide one or many advantages over the existing art. In some use case scenarios, it may be important or desired to reduce the footprint of the resource usage even further. To this end, reference is now made to FIGS. 3 and 9 together with FIGS. 1 and 2. FIG. 9 illustrates a flowchart of a method performed by a wireless device (FIGS. 1 and 2) in accordance with an example embodiment.

It should be appreciated that the actions do not necessarily have to be performed, or otherwise executed, in the exact order as described with reference to FIGS. 3 and 9. However, in advantageous implementations, the actions may be performed in the exact order as described with reference to FIGS. 3 and 9.

Action 310: As described earlier, it may be determined whether a vehicle operation has occurred. For example, said vehicle operation may be a vehicle start operation (i.e., activation of the vehicle).

Action 320: Also as described earlier, a BLE advertising message is broadcasted, i.e. transmitted, to wireless device (s) located in a vicinity of the UI device 110. The BLE advertising message is generally receivable by any wireless device 118 that is in vicinity, i.e. within the short-range specified for BLE advertising messages, of the UI device 110. That is, any wireless device within the cabin of the vehicle 80 or in close proximity of the vehicle (not necessarily inside the cabin of the vehicle 80) may typically receive a BLE advertising message broadcasted by the UI device 110.

In advantageous embodiments, action 320 may be made conditional on action 310. That is, the BLE advertising message is then broadcasted only responsive to a determination that the vehicle operation (e.g., vehicle start operation (i.e., activation of the vehicle)) occurred. In such embodiments, the BLE advertising message may be triggered, or otherwise initiated, by the occurrence of the vehicle operation. For example, and in some embodiments, when a driver starts the engine of the vehicle, this will trigger or otherwise initiate the broadcasting of said BLE advertising message by the UI device 110 to any nearby wireless device 118. This has the advantage of making the triggering or initiation of the broadcasting of the BLE message increasingly automatic. In addition, this may save resources as the signaling (or broadcasting) of the BLE advertising message only has to be performed upon a determination that the vehicle operation (e.g. vehicle start operation (i.e., activation of the vehicle)) actually occurs.

Action 910: It may be determined, or otherwise concluded, whether the wireless device 118 has received a broadcasted BLE advertising message from the UI device 110.

Action 920: Responsive to a receipt of a broadcasted BLE advertising message from a UI device 110, an application module of the wireless device 118 is woken or otherwise started.

Action 930: If, or when, an application module has been woken or otherwise started in action 920, the application module initiates a checking operation to determine whether the wireless device 118 is paired (i.e., is in a current wireless connection) or is in a current cabled connection with said vehicle head unit 84 of the vehicle 80.

In some embodiments, the checking operation to determine whether the wireless device 118 is paired includes a checking operation to determine whether the wireless device 118 is wirelessly paired with said vehicle head unit of the vehicle 80 by means of Bluetooth technology. Other short-range technologies are also conceivable, which will be appreciated by those skilled in the art.

In some embodiments, the checking operation to determine whether the wireless device is in a current cabled connection includes a checking operation to determine whether the wireless device 118 is in a current cabled connection with said vehicle head unit 84 of the vehicle 80 via a USB connection or an AUX connection.

Action 940: If, or when, it is determined that the wireless device 118 is paired or is in a current cabled connection with the vehicle head unit of the vehicle, the wireless device 118 is authorized for communication with the UI device 110 to enable the UI device 110 to remotely control the media presentation as presented by the application module of the wireless device. For example, the application module may authorize the UI device 110 to remotely control media presentation as presented by the application module wirelessly by means of Bluetooth technology, e.g. Classic Bluetooth. Other short range technologies may also be conceived.

If, or when, it is determined that the wireless device 118 is not paired with the vehicle head unit and is not in a current cabled connection with the vehicle head unit 84, the method may end. Alternatively, the method could continue by repeating action 930 at certain, e.g. pre-defined, intervals.

In some implementations, it is not necessary that it is the application module that initiates the checking operation. Hence, it is optional to wake up/start the application module (Action 920) responsive to receiving a BLE advertising message (Action 910). Instead, the wireless device 118 may be configured to initiate the checking operation (Action 930) independently of an application module. If so, the application module may instead be woken/started responsive to the wireless device having been authorized for the communication with the UI device 110 (Action 940).

As will be appreciated from the above, a wireless device 118 having an active connection (wired or wireless) will be authorized for the remote control by means of the UI device 110. Compared with the aspects and embodiments described in conjunction with FIG. 4, aspects and embodiments described with reference to FIG. 9 may have the additional advantage of reducing any potential signaling overload. Hence, the resources may be saved if aspects and embodiments described with reference to FIG. 9 are reduced to practice.

Numbered Example Embodiments

The technology described in this disclosure thus encompasses without limitation the following numbered example embodiments:

E1. A method for selecting a wireless device (118) to be remotely controlled by a User Interface, UI, device (110) for media presentation in a vehicle (80), the method comprising:

the UI device (110) broadcasting (320) a Bluetooth Low Energy, BLE, advertising message receivable by one or several wireless devices (118) located in a vicinity of the UI device (110);

responsive to a receipt (410) of a broadcasted BLE advertising message from the UI device (110), waking up (420) an application module of each one of the wireless devices (118) located in the vicinity of the UI device (110); and in each one of said wireless devices (118):

the application module authorizing (430) the UI device to remotely control media presentation as presented by the application module; and the application module further initiating (440) a checking operation to determine whether the wireless device (118) is paired or is in a current cabled connection with a vehicle head unit (84) of the vehicle (80); and upon a determination that the wireless device (118) is paired or is in a current cabled connection with the vehicle head unit (84), selecting (450) the wireless device (118) for subsequent communication with the UI device (110) to enable the UI device (110) to continue to remotely control the media presentation as presented by the application module of the wireless device (118); else upon a determination that the wireless device (118) is not paired with the vehicle head unit (84) and is not in a current cabled connection with the vehicle head unit (84), terminating (460) the authorization of the UT device to remotely control media presentation as presented by the application module.

E2. The method according to embodiment E1, wherein the UT device (110) is mounted to a structure of the vehicle (80) and wherein the UI device (110) is separate and distinct from the vehicle head unit (84) of the vehicle (80).

E3. The method according to embodiment E1 or E2, wherein: broadcasting (220) the BLE advertising message occurs responsive to an occurrence (310) of a vehicle operation, such as a vehicle start operation (i.e., activation of the vehicle).

E4. The method according to any one of the embodiments E1-E3, wherein the application module authorizing the UI device (110) to remotely control media presentation as presented by the application module includes:

the application module authorizing (430) the UI device (110) to remotely control media presentation as presented by the application module wirelessly by means of Bluetooth technology.

E5. The method according to any one of the embodiments E1-E4, wherein the application module further initiating a checking operation to determine whether the wireless device (118) is paired includes a checking operation to determine whether the wireless device (118) is wirelessly paired by means of Bluetooth technology.

E6. The method according to any one of the embodiments E1-E5, wherein the application module further initiating a checking operation to determine whether the wireless device (118) is in a current cabled connection includes a checking operation to determine whether is in a current cabled connection with said vehicle head unit of the vehicle via a Universal Serial Bus, USB, connection or an auxiliary, AUX, connection.

E7. A method performed by a User Interface, UI, device (110), for assisting in selecting a wireless device (118) to be remotely controlled by the UI device (110) for media presentation in a vehicle (80), the method comprising: broadcasting (320) a Bluetooth Low Energy, BLE, advertising message receivable by one or several wireless devices (118) located in a vicinity of the UI device (110).

E8. The method according to embodiment E7, wherein: broadcasting (220) the BLE advertising message occurs responsive to an occurrence (310) of a vehicle operation, such as a vehicle start operation (i.e., activation of the vehicle).

E9. A method performed by a wireless device (118) for assisting in selecting a wireless device (118) to be remotely controlled by a User Interface, UI, device (110) for media presentation in a vehicle (80), the method comprising:

responsive to a receipt (410) of a broadcasted Bluetooth Low Energy, BLE, advertising message from the UI device (110), waking up (420) an application module of the wireless device (118);

authorizing (430), by the application module, the UI device (110) to remotely control media presentation as presented by the application module; and initiating (440), by the application module, a checking operation to determine whether the wireless device (118) is paired or is in a current cabled connection with a vehicle head unit (84) of the vehicle (80); and upon a determination that the wireless device (118) is paired or is in a current cabled connection with the vehicle head unit (84), selecting (450) the wireless device (118) for subsequent communication with the UI device (110) to enable the UI device (110) to continue remotely control the media presentation as presented by the application module of the wireless device; else upon a determination that the wireless device (118) is not paired with the vehicle head unit and is not in a current cabled connection with the vehicle head unit (84), terminating (460) the authorization of the UI device (110) to remotely control media presentation as presented by the application module.

E10. The method according to embodiment E9, wherein the application module authorizing the UI device (110) to remotely control media presentation as presented by the application module includes:

the application module authorizing (430) the UI device (110) to remotely control media presentation as presented by the application module wirelessly by means of Bluetooth technology.

E11. The method according to embodiment E9 or E10, wherein the application module further initiating (440) a checking operation to determine whether the wireless device is paired includes a checking operation to determine whether the wireless device is wirelessly paired by means of Bluetooth technology.

E12. The method according to any one of the embodiments E9-E11, wherein the application module further initiating (440) a checking operation to determine whether the wireless device is in a current cabled connection includes a checking operation to determine whether is in a current cabled connection with said vehicle head unit of the vehicle via a Universal Serial Bus, USB, connection or an auxiliary, AUX, connection.

E13. A wireless device (118), comprising:
at least one processor (118-5a); and
a memory (118-5b), said memory (118-5b) comprising instructions executable by said at least one processor (118-5a) whereby the wireless device (118) is operative to perform the method according to any one of the embodiments E9-E12.

E14. A User Interface, UI, device (110) mountable at a structure of a vehicle (80) for assisting in selecting a wireless device (118) to be remotely controlled by the UI device (110) for media presentation in the vehicle (80), the UI device (110) being configured to:

broadcast a Bluetooth Low Energy, BLE, advertising message receivable by wireless device(s) according to embodiment 13, which is/are located in a vicinity of the UI device (110).

E15. The UI device (110) according to embodiment E14, wherein the UI device (110) is configured to broadcast the BLE advertising message responsive to an occurrence of a vehicle operation, such as an engine start operation.

E16. A method for selecting a wireless device (118) to be remotely controlled by a User Interface, UI, device (110) for media presentation in a vehicle (80), the method comprising:

the UI device (110) broadcasting (320) a Bluetooth Low Energy, BLE, advertising message receivable by one or several wireless devices (118) located in a vicinity of the UI device (110);

responsive to a receipt (910) of a broadcasted BLE advertising message from the UI device (110), waking up (920) an application module of each one of the wireless devices (118) located in the vicinity of the UI device (110); and in each one of said wireless devices (118):

the application module initiating (930) a checking operation to determine whether the wireless device (118) is paired or is in a current cabled connection with a vehicle head unit (84) of the vehicle (80); and upon a determination that the wireless device (118) is paired or is in a current cabled connection with the vehicle head unit (84), authorizing (940) the wireless device (118) for subsequent communication with the UI device (110) to enable the UI device (110) to remotely control the media presentation as presented by the application module of the wireless device (118).

E17. The method according to embodiment E16, wherein the UI device (110) is mounted to a structure of the vehicle

(80) and wherein the UI device (110) is separate and distinct from the vehicle head unit (84) of the vehicle (80).

E18. The method according to embodiment E16 or E17, wherein: broadcasting (220) the BLE advertising message occurs responsive to an occurrence (310) of a vehicle operation, such as a vehicle start operation (i.e., activation of the vehicle).

E19. The method according to any one of the embodiments E16-E18, wherein the application module authorizing the UI device (110) to remotely control media presentation as presented by the application module includes:

the application module authorizing (940) the UI device (110) to remotely control media presentation as presented by the application module wirelessly by means of Bluetooth technology.

E20. The method according to any one of the embodiments E16-E19, wherein the application module initiating a checking operation to determine whether the wireless device (118) is paired includes a checking operation to determine whether the wireless device (118) is wirelessly paired by means of Bluetooth technology.

E21. The method according to any one of the embodiments E16-E20, wherein the application module initiating a checking operation to determine whether the wireless device (118) is in a current cabled connection includes a checking operation to determine whether is in a current cabled connection with said vehicle head unit of the vehicle via a Universal Serial Bus, USB, connection or an auxiliary, AUX, connection.

E22. A method performed by a User Interface, UI, device (110), for assisting in selecting a wireless device (118) to be remotely controlled by the UI device (110) for media presentation in a vehicle (80), the method comprising:

broadcasting (320) a Bluetooth Low Energy, BLE, advertising message receivable by one or several wireless devices (118) located in a vicinity of the UI device (110).

E23. The method according to embodiment E22, wherein: broadcasting (220) the BLE advertising message occurs responsive to an occurrence (310) of a vehicle operation, such as a vehicle start operation (i.e., activation of the vehicle).

E24. A method performed by a wireless device (118) for assisting in selecting a wireless device (118) to be remotely controlled by a User Interface, UI, device (110) for media presentation in a vehicle (80), the method comprising:

responsive to a receipt (910) of a broadcasted Bluetooth Low Energy, BLE, advertising message from the UI device (110), waking up (920) an application module of the wireless device (118);

initiating (930), by the application module, a checking operation to determine whether the wireless device (118) is paired or is in a current cabled connection with a vehicle head unit (84) of the vehicle (80); and upon a determination that the wireless device (118) is paired or is in a current cabled connection with the vehicle head unit (84), authorizing (940) the wireless device (118) for subsequent communication with the UI device (110) to enable the UI device (110) to remotely control the media presentation as presented by the application module of the wireless device.

E25. The method according to embodiment E24, wherein the application module authorizing the UI device (110) to remotely control media presentation as presented by the application module includes:

the application module authorizing (430) the UI device (110) to remotely control media presentation as presented by the application module wirelessly by means of Bluetooth technology.

E26. The method according to embodiment E24 or E25, wherein the application module initiating (930) a checking operation to determine whether the wireless device is paired includes a checking operation to determine whether the wireless device is wirelessly paired by means of Bluetooth technology.

E27. The method according to any one of the embodiments E24-E26, wherein the application module initiating (930) a checking operation to determine whether the wireless device is in a current cabled connection includes a checking operation to determine whether is in a current cabled connection with said vehicle head unit of the vehicle via a Universal Serial Bus, USB, connection or an or an auxiliary, AUX, connection.

E28. A wireless device (118), comprising:
at least one processor (118-5a); and
a memory (118-5b), said memory (118-5b) comprising instructions executable by said at least one processor (118-5a) whereby the wireless device (118) is operative to perform the method according to any one of the embodiments E24-E27.

E29. A User Interface, UI, device (110) mountable at a structure of a vehicle (80) for assisting in selecting a wireless device (118) to be remotely controlled by the UI device (110) for media presentation in the vehicle (80), the UI device (110) being configured to:

broadcast a Bluetooth Low Energy, BLE, advertising message receivable by wireless device(s) according to embodiment E28, which is/are located in a vicinity of the UI device (110).

E30. The UI device (110) according to embodiment E29, wherein the UI device (110) is configured to broadcast the BLE advertising message responsive to an occurrence of a vehicle operation, such as an engine start operation.

In the detailed description hereinabove, for purposes of explanation and not limitation, specific details are set forth in order to provide a thorough understanding of various aspects and embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flowcharts and the like represent various processes which may be substantially represented in computer-readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer-readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having the benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs are not to be construed as limiting the extent of the matter protected by the claims. Their sole function is to make the claims easier to understand.

What is claimed is:

1. A method for media presentation in a vehicle, the method comprising:
   at a first wireless device:
      receiving a Bluetooth Low Energy (BLE) advertising message from a user interface (UI) device, wherein the BLE advertising message is receivable by wireless devices located in a vicinity of the UI device;
      responsive to a receipt of the BLE advertising message from the UI device:
         waking up an application module of the first wireless device;
         authorizing, using the application module, the UI device to remotely control media presentation as presented by the application module; and
         determining, using the application module, a first determination of whether the first wireless device is paired or is in a current cabled connection with a vehicle head unit of the vehicle; and
   in accordance with the first determination being a determination that the first wireless device is paired or is in a current cabled connection with the vehicle head unit, automatically selecting the first wireless device for subsequent communication with the UI device to enable the UI device to continue to remotely control the media presentation as presented by the application module of the first wireless device; and
   in accordance with the first determination being a determination that the first wireless device is not paired with the vehicle head unit and is not in a current cabled connection with the vehicle head unit, automatically terminating the authorization of the UI device to remotely control media presentation as presented by the application module.

2. The method according to claim 1, wherein the UI device is separate and distinct from the vehicle head unit of the vehicle.

3. The method according to claim 1, wherein the UI device is mounted to a structure of the vehicle.

4. The method according to claim 1, wherein the BLE advertising message is broadcast by the UI device in response to a predefined vehicle operation.

5. The method according to claim 4, wherein the predefined vehicle operation is a vehicle start operation.

6. The method according to claim 1, wherein authorizing, using the application module, the UI device to remotely control media presentation as presented by the application module includes:
   authorizing the UI device to remotely control media presentation as presented by the application module wirelessly using Bluetooth technology.

7. The method according to claim 1, wherein determining, using the application module, the first determination of whether the first wireless device is paired or is in a current cabled connection with a vehicle head unit of the vehicle includes determining whether the first wireless device is wirelessly paired using Bluetooth technology.

8. The method according to claim 1, wherein determining, using the application module, the first determination of whether the first wireless device is paired or is in a current cabled connection with a vehicle head unit of the vehicle includes determining whether the first wireless device is in a current cabled connection with said vehicle head unit of the vehicle via a Universal Serial Bus (USB) connection or an auxiliary (AUX) connection.

9. The method according to claim 1, wherein the first determination, using the application module, of whether the first wireless device is paired or is in a current cabled connection with the vehicle head unit of the vehicle is performed after authorizing, using the application module, the UI device to remotely control media presentation as presented by the application module.

10. A first wireless device, comprising:
    one or more processors; and
    memory storing one or more programs, the one or more programs including instructions for:
       receiving a Bluetooth Low Energy (BLE) advertising message from a user interface (UI) device, wherein the BLE advertising message is receivable by wireless devices located in a vicinity of the UI device;
       responsive to a receipt of the BLE advertising message from the UI device:
          waking up an application module of the first wireless device;
          authorizing, using the application module, the UI device to remotely control media presentation as presented by the application module; and determining, using the application module, a first determination of whether the first wireless device is paired or is in a current cabled connection with a vehicle head unit of a vehicle; and in accordance with the first determination being a determination that the first wireless device is paired or is in a current cabled connection with the vehicle head unit, automatically selecting the first wireless device for subsequent communication with the UI device to enable the UI device to continue to remotely control the media presentation as presented by the application module of the first wireless device; and in accordance with the first determination being a determination that the first wireless device is not paired with the vehicle head unit and is not in a current cabled connection with the vehicle head unit, automatically terminating the authorization of the UI device to remotely control media presentation as presented by the application module.

11. The first wireless device according to claim 10, wherein the UI device is separate and distinct from the vehicle head unit of the vehicle.

12. The first wireless device according to claim 10, wherein the UI device is mounted to a structure of the vehicle.

13. The first wireless device according to claim 10, wherein the BLE advertising message is broadcast by the UI device in response to a predefined vehicle operation.

14. The first wireless device according to claim 13, wherein the predefined vehicle operation is a vehicle start operation.

15. The first wireless device according to claim 10, wherein authorizing, using the application module, the UI device to remotely control media presentation as presented by the application module includes:

authorizing the UI device to remotely control media presentation as presented by the application module wirelessly using Bluetooth technology.

16. The first wireless device according to claim 10, wherein determining, using the application module, the first determination of whether the first wireless device is paired or is in a current cabled connection with a vehicle head unit of the vehicle includes determining whether the first wireless device is wirelessly paired using Bluetooth technology.

17. The first wireless device according to claim 10, wherein determining, using the application module, the first determination of whether the first wireless device is paired or is in a current cabled connection with a vehicle head unit of the vehicle includes determining whether the first wireless device is in a current cabled connection with said vehicle head unit of the vehicle via a Universal Serial Bus (USB) connection or an auxiliary (AUX) connection.

18. The first wireless device according to claim 10, wherein the first determination, using the application module, of whether the first wireless device is paired or is in a current cabled connection with the vehicle head unit of the vehicle is performed after authorizing, using the application module, the UI device to remotely control media presentation as presented by the application module.

19. A non-transitory storage medium storing one or more programs, the one or more programs including instructions, executable by a first wireless device, for:

receiving a Bluetooth Low Energy (BLE) advertising message from a user interface (UI) device, wherein the BLE advertising message is receivable by wireless devices located in a vicinity of the UI device;

responsive to a receipt of the BLE advertising message from the UI device:

waking up an application module of the first wireless device;

authorizing, using the application module, the UI device to remotely control media presentation as presented by the application module; and determining, using the application module, a first determination of whether the first wireless device is paired or is in a current cabled connection with a vehicle head unit of a vehicle; and in accordance with the first determination being a determination that the first wireless device is paired or is in a current cabled connection with the vehicle head unit, automatically selecting the first wireless device for subsequent communication with the UI device to enable the UI device to continue to remotely control the media presentation as presented by the application module of the first wireless device; and in accordance with the first determination being a determination that the first wireless device is not paired with the vehicle head unit and is not in a current cabled connection with the vehicle head unit, automatically terminating the authorization of the UI device to remotely control media presentation as presented by the application module.

\* \* \* \* \*